United States Patent
Yeo et al.

(10) Patent No.: US 12,111,960 B2
(45) Date of Patent: Oct. 8, 2024

(54) METHOD AND DEVICE FOR PROVING ORIGINALITY OF CREATIVE DESIGN IN COMMUNICATION SYSTEM

(71) Applicants: Tae Hwan Yeo, Seoul (KR); Bong Sup Lee, Seoul (KR)

(72) Inventors: Tae Hwan Yeo, Seoul (KR); Bong Sup Lee, Seoul (KR)

( * ) Notice: Subject to any disclaimer, the term of this patent is extended or adjusted under 35 U.S.C. 154(b) by 0 days.

(21) Appl. No.: 18/667,434

(22) Filed: May 17, 2024

(65) Prior Publication Data

US 2024/0303379 A1  Sep. 12, 2024

Related U.S. Application Data

(63) Continuation of application No. PCT/KR2023/004263, filed on Mar. 30, 2023.

(30) Foreign Application Priority Data

Dec. 26, 2022 (KR) ......................... 10-2022-0184286

(51) Int. Cl.
G06F 21/64 (2013.01)
H04L 9/32 (2006.01)

(52) U.S. Cl.
CPC ............ *G06F 21/64* (2013.01); *H04L 9/3213* (2013.01)

(58) Field of Classification Search
CPC ............................... G06F 21/64; H04L 9/3213
See application file for complete search history.

(56) References Cited

FOREIGN PATENT DOCUMENTS

| CN | 108364242 A | * | 8/2018 |
|---|---|---|---|
| KR | 1020190108441 A | | 9/2019 |
| KR | 1020190123572 A | | 11/2019 |
| KR | 1020200021853 A | * | 3/2020 |
| KR | 1020210140801 A | * | 11/2021 |
| KR | 102513588 B1 | | 3/2023 |

OTHER PUBLICATIONS

International Search Report issued in corresponding International Application PCT/KR2023/004263, mailed Sep. 8, 2023, 4 pages.

(Continued)

*Primary Examiner* — Henry Tsang
(74) *Attorney, Agent, or Firm* — Burris Law, PLLC

(57) ABSTRACT

A method and device of the present disclosure can prove the originality of a creative design in a communication system by proving the causal relationship between the creation process of the creative design and the creation result using the hash codes related to images in creation stages of the creative design. The method and device combine hash codes for intermediate images in the creation process of a creative design and a hash code for a final image using an operation function to generate one piece of final hash information and then transmit a non-fungible token (NFT) including the final hash information and final image information to a blockchain so that the design creator can claim the connection between the intermediate images in the creation process of the creative design and the final image at the time of disclosing the design on the blockchain network.

7 Claims, 15 Drawing Sheets

(56) References Cited

OTHER PUBLICATIONS

Kwon Dan, Legal issues of NFTs, art works seen through examples _ Character copyright explained through examples, Aug. 10, 2022, and an English Translation, 8 pages, available at URL https://ilovecharacter.com/news/newsview.php?ncode=1065578539636863&dt=m.

Notice of Allowance issued in corresponding KR Application 10-2022-0184286, issued Mar. 9, 2023, and an English Translation, 7 pages.

Office Action issued in corresponding KR Application 10-2022-0184286, issued Feb. 27, 2023 and an English Translation, 5 pages.

Notice of Preliminary Exam Result issued in corresponding KR Application 10-2022-0184286, issued Jan. 27, 2023, and an Engish Translation, 10 pages.

* cited by examiner

FIG. 5
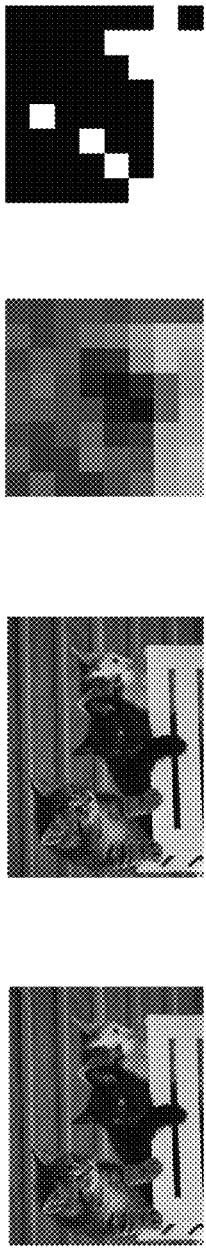
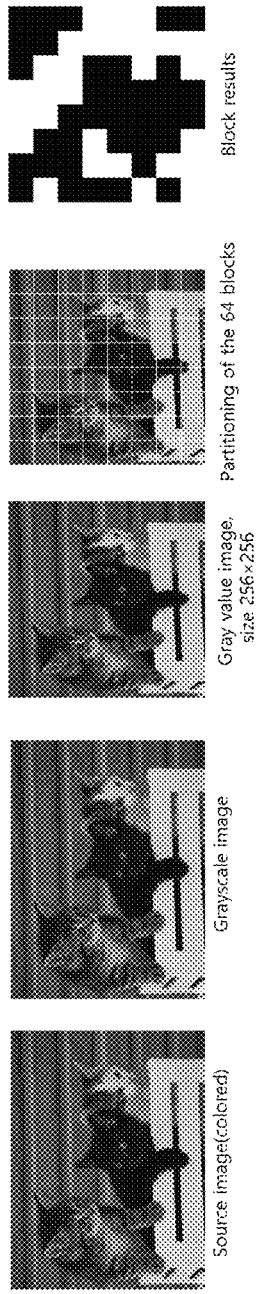

FIG. 6
DIFFERENCE HASH
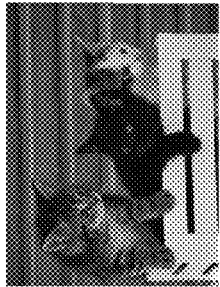
Source image(colored)
Grayscale image
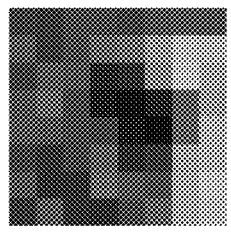
Gray value image, size 9×8
Comparison to the neighbor to the right
Hash: 1111000001100001011100011001100110001110100011110
MEDIAN HASH
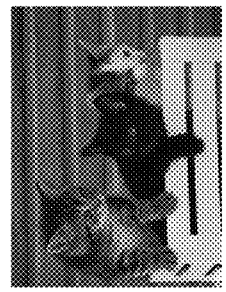
Source image(colored)
Grayscale image
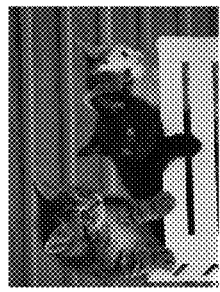
Gray value image, size 8×8
Comparison to median
Hash: 000000000100111000000110000001100011010000101000011111111111111111

FIG. 7
PERCEPTUAL HASH
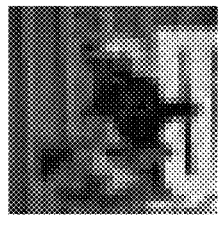
Source image(colored)
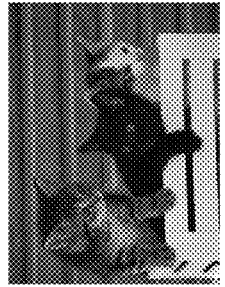
Grayscale image
Gray value image, size 32×32
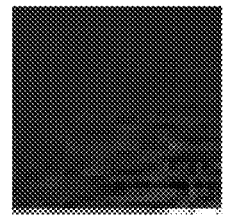
After DCT by row (normalized)
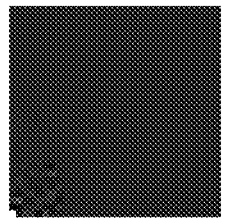
After DCT by column (normalized)
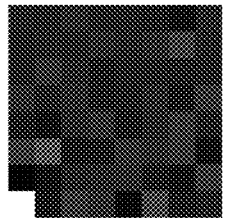
Upper left corner (highest frequency)
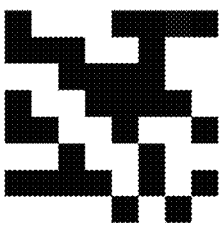
Comparison to median
Hash: 1010010010101101110011001101101100011010001010010000011101101010101110

METHOD AND DEVICE FOR PROVING ORIGINALITY OF CREATIVE DESIGN IN COMMUNICATION SYSTEM

CROSS-REFERENCE TO RELATED APPLICATIONS

This application is a continuation of International Application No. PCT/KR2023/004263, filed on Mar. 30, 2023, which claims priority to and the benefit of Korean Patent Application No. 10-2022-0184286, filed on Dec. 26, 2022. The disclosures of the above applications are incorporated herein by reference.

FIELD

The present disclosure relates to a method and device for proving the originality of a creative design work and who is the original creator in a communication system by proving the causal relationship between the creation process of the creative design work and the creation result.

BACKGROUND

The statements in this section merely provide background information related to the present disclosure and may not constitute prior art.

The design industry is characterized by the importance of creativity represented by the uniqueness of designs, fast market flow, and easy replication.

Although there are procedures for registering and protecting designs on the basis of the law, it takes a certain amount of time to register. Also, it is not easy to prove whether a design is copied from a creative design registered using a registered design right using tangible evidence with temporal precedence.

In general, clothing, shoes, hats, accessories such as jewelry and the like, furniture, various belongings, art works, commercial and non-commercial designs, and the like that are created by humans and have visual elements having an overwhelming influence on the determination of value are subject to rights on the basis of the finished final creative works, final creations, or final creative work images. However, determining rights solely on the basis of "the final creative work and the final creative work image" cannot prove the artistic value of the narrative inherent in the work and the intermediate results obtained in the creation process, and cannot protect the rights of the creator to the intermediate results that are obtained during a process from conception to completion of the creative work. In other words, the value of a creative work is not limited to the "final work and final creative work image," and the artistic and economic value of the intermediate outcomes of the creation process should also be protected by the rights of the original creator and copyright holder. Lately, there have been a number of cases where third parties have tried to pursue economic benefits by issuing non-fungible tokens (NFTs) without the content of the original creators or copyright holders. However, there is no appropriate method of punishment, and many similar lawsuits have been filed repeatedly.

When it is clear to each member of the market that a design has been stolen, it may be possible for the market to protect the creative design from copycat designs by its own judgment. The market wants to safely invest in genuinely creative designs that have legitimate rights. In other words, the current unfair advantage of copycat designs in the market is due in large part to the market's inability to determine which designs are truly original.

When each member of the relevant market can quickly and clearly determine and recognize that a design is a stolen or plagiarized design of an original creative design work, it is possible to effectively respond to theft and plagiarism of creative design works (fashion apparel, commercial and non-commercial art, and the like) of which visual elements have an overwhelming influence on value determination, creators' rights to creative design works can be legitimately protected, and investors who expect economic benefits from various ancillary businesses utilizing creative design works are able to make relatively safe investments. Therefore, this is a reasonable basis for original creators to expect economic benefits from the rental or transfer of the images of their creative works and the licenses to use the works. Currently, there are many cases of illegal behavior being used for gaining unfair economic benefits by illegally plagiarizing and stealing images of other people's creative designs. These cases may not only cause economic and mental damage to innocent creators but may also increase the social cost of such illegal behavior, which will have a negative impact on the overall society.

Copyright is obtained at the time of creation and does not require any procedure or formality. This is called the "non-formality principle." This is different from industrial property rights, such as patents, designs, trademarks, and the like, which require a registered application to create rights. A creator is not obligated to disclose the original design, only to prove that he or she created the design at a specific point in time in the event of a question of causation.

Therefore, when a creator conflicts with a certain third party about the creation process of a final image after disclosing only the final image to a number of unspecified people with no intermediate images in order to avoid disclosing the intermediate images to a number of unspecified people, there is a necessity for a method and device to prove the narrative that the creator created the intermediate images in the creation process of the final image and finished the final image.

Creators are not obligated to disclose images of their creation processes, and instead disclose only their works as final creative images and final resultant images. However, there is no technically flawless method of proving to a third party that a work is created by a creator himself or herself, and a method and device are necessary to verify the narrative and originality based on causal proof that a work was obtained as a final image through intermediate stages in a creation process.

SUMMARY

This section provides a general summary of the disclosure and is not a comprehensive disclosure of its full scope or all of its features.

Various embodiments of the present invention provide a method and device for "specifying and authenticating a creator" using a mobile communication device equipped with a digital camera and a dedicated application installed on the mobile communication device as a method of proving the "uniqueness of a creative design work," sequentially taking and recording many digital photographs of "intermediate creative results and a final creative result" generated in the creator's creation process, generating and encrypting unique functions for the "intermediate creative works or intermediate creative work images" acquired through the process and "the final creative work and the final creative work image" finished through the process on the basis of metadata of each image according to a determined procedure and method, transmitting and registering the encrypted unique functions in a blockchain, and proving the originality together with the narrative of the creator's entire creation process while proving the artistic and economic value of the intermediate stage of the creation process.

To solve the foregoing problem, the present invention has the following objects.

The present invention is directed to providing a method and device for proving the originality of a creative design in a communication system by proving the causal relationship between the creation process of the creative design and a work as a creation result using hash codes related to digital images of images in creation stages of the creative design.

The present invention is also directed to providing a method and device for proving the time of creation of a creative design in a communication system by disclosing a final image of the creative design on a blockchain network using a non-fungible token (NFT) and then proving the originality of the creative design by proving the narrative that the final image was created through the creation of intermediate images in the creation process of the final image in the event of a problem with the creation process of the final image, for example, a problem of checking whether a third party was involved in the work by verifying who actually performed the creative work in terms of plagiarism, theft, or the like.

The present invention is also directed to providing a method and device for generating one piece of final hash information by combining hash codes for intermediate images in the creation process of a creative design, such as a painting, an art work, an apparel design, a commercial or non-commercial design, or the like, and a hash code for a final image using an operation function and then transmitting an NFT including the final hash information and information on the final image to a blockchain so that a design creator can claim the association between the intermediate images in the creation process and the final image at the time of disclosing the design on the blockchain network.

The present invention is also directed to providing a method and device for supporting proof of the creation of intermediate images in the creation process of a final image by transmitting information on the intermediate images, hash functions, and operation functions to a specific third party as elements for generating final hash information included in an NFT of the final image when a creator who does not want to disclose the intermediate images in the creation process of the creative design to a number of unspecified people is requested by the third party to prove the creation process of the final image of the creative design.

Objects of the present invention are not limited to those described above, and other objects which have not been described will be clearly understood by those of ordinary skill in the art from the following description.

One aspect of the present invention provides an operating method of a first terminal including a transceiver, a memory, a processor, an input device, an output device, and a camera in a communication system, the operating method including capturing, by the camera, a plurality of intermediate images in creation stages of a design and one final image, wherein the plurality of intermediate images are captured during creation times of the creation stages of the design and the final image is captured during a final creation time of the design, generating, by the processor, a plurality of pieces of intermediate image hash information corresponding to the plurality of intermediate images and final image hash information corresponding to the final image using a first function stored in the memory, generating, by the processor, final hash information based on the plurality of pieces of intermediate image hash information and the final image hash information using a second function stored in the memory, generating, by the processor, first block information about a first non-fungible token (NFT) based on information related to the first terminal, information on the final image, and the final hash information, transmitting, by the transceiver, the first block information to a blockchain network, receiving, by the transceiver, a proof request message for the plurality of intermediate images generated in a creation process of the final image corresponding to the first NFT from a second terminal which is one of a plurality of nodes constituting the blockchain network, and transmitting, by the transceiver, a proof response message including information on the plurality of intermediate images, information on the first function, and information on the second function to the second terminal.

Another aspect of the present invention provides a first terminal in a communication system, the first terminal including a transceiver, a memory, a processor, an input device, an output device, and a camera. The processor is configured to perform an operating method of the first terminal according to various embodiments of the present invention.

Still another aspect of the present invention provides a computer program configured to perform an operating method of a first terminal according to various embodiments of the present invention and recorded on a computer-readable storage medium.

According to the present invention, it is possible to provide a method and device for proving the narrative and originality of a creative design in a communication system by proving the causal relationship between the creation process of the creative design and a creation result using hash codes related to images in creation stages of the creative design.

According to the present invention, it is also possible to provide a method and device for proving the time of creation of a creative design in a communication system by disclosing a final image of the creative design on a blockchain network using a non-fungible token (NFT) and then proving the originality of the creative design by proving the narrative that the final image was created through the creation of intermediate images in the creation process of the final image in the event of a problem with the creation process of the final image.

According to the present invention, it is also possible to provide a method and device for generating one piece of final hash information by combining hash codes for intermediate images in the creation process of a creative design, such as a painting, an art work, an apparel design, a commercial or non-commercial design, or the like, and a hash code for a final image using an operation function and then transmitting an NFT including the final hash information and information on the final image to a blockchain so that a design creator can claim the association between the intermediate images in the creation process and the final image at the time of disclosing the design on the blockchain network.

According to the present invention, it is also possible to provide a method and device for supporting proof of the creation of intermediate images in the creation process of a final image by transmitting information on the intermediate images, hash functions, and operation functions to a specific third party as elements for generating final hash information included in an NFT of the final image when a creator who does not want to disclose the intermediate images in the creation process of the creative design to a number of unspecified people is requested by the third party to prove the creation process of the final image of the creative design.

Effects of the present invention are not limited to those described above, and other effects which have not been described will be clearly understood by those of ordinary skill in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 shows examples of image hash functions that are applicable to an image according to various embodiments of the present invention.

FIG. 6 shows examples of image hash functions that are applicable to an image according to various embodiments of the present invention.

FIG. 7 shows an example of an image hash function that is applicable to an image according to various embodiments of the present invention.

Figure 1:
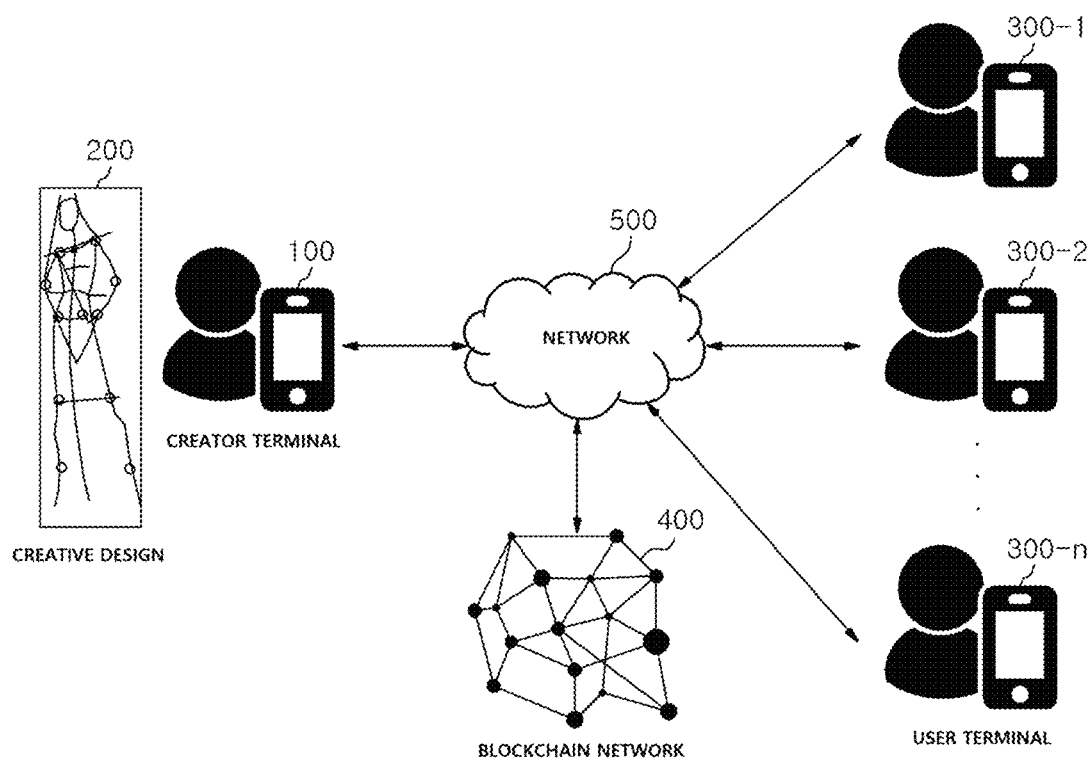
FIG. 1 is a diagram of a communication system according to various embodiments of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present invention will be described in detail with reference to the accompanying drawings so that those skilled in the technical field to which the present invention pertains can easily implement the present invention. The present invention can be implemented in various different forms and is not limited to the embodiments described below.

FIG. 1 is a diagram of a communication system according to various embodiments of the present invention.

Referring to FIG. 1, a communication system according to an embodiment of the present invention includes a creator terminal 100, user terminals 300 (300-1, 300-2, . . . , and 300-*n*), a blockchain network 400, and a wired/wireless communication network 500.

The creator terminal 100 is a terminal run by a creator of a creative design 200. The creator terminal 100 may capture an image of the creative design 200, generate encryption information on the basis of the captured image, and transmit the generated encryption information to the blockchain network 400 through the wired/wireless communication network 500. The creator terminal 100 may be an electronic device, such as a computer, a cellular phone, a smartphone, a tablet computer, or the like, that includes a transceiver for transmitting and receiving information, a memory for storing information, at least one processor for computing information, an input device for inputting information, an output device for outputting information, a camera, and the like.

The user terminals 300 (300-1, 300-2, . . . , and 300-*n*) correspond to nodes constituting the blockchain network 400 and are terminals for accessing the blockchain network 400 through the wired/wireless communication network 500 and transmitting and receiving information. Users of the user terminals 300 (300-1, 300-2, . . . , and 300-*n*) may receive information on the creative design 200 from the blockchain network 400 and recognize the information on the creative design 200. The user terminals 300 (300-1, 300-2, . . . , and 300-*n*) may be electronic devices, such as a computer, a cellular phone, a smartphone, a tablet computer, and the like, that include a transceiver for transmitting and receiving information, a memory for storing information, at least one processor for computing information, an input device for inputting information, an output device for outputting information, a camera, and the like.

The blockchain network 400 is a plurality of nodes that operate on the basis of blockchain technology. The blockchain technology is a distributed storage technology for storing data to be managed in a plurality of nodes constituting a blockchain network using a storage structure in which blocks are connected in a chain form. The blockchain network 400 may store a transaction received from at least one of nodes, such as the creator terminal 100, the user terminals 300 (300-1, 300-2, . . . , and 300-n), and the like, constituting the blockchain network in the form of a block on the basis of a predetermined consensus algorithm. The data stored in the form of a block may be shared among the plurality of nodes constituting the blockchain network 400. Depending on the implementation form, the blockchain network 400 may be a public blockchain network in which arbitrary nodes may perform a consensus operation or a private blockchain network in which only predetermined nodes may perform a consensus operation.

The consensus algorithm used in the blockchain network 400 according to various embodiments of the present invention may be a proof of work (PoW) algorithm, a proof of stake (PoS) algorithm, a delegated proof of stake (DPoS) algorithm, a practical byzantine fault tolerance (PBFT) algorithm, a delegated byzantine fault tolerance (DBFT) algorithm, a redundant byzantine fault tolerance (RBFT) algorithm, a sieve algorithm, a Tendermint algorithm, a Paxos algorithm, a Raft algorithm, a proof of authority (PoA) algorithm, and/or a proof of elapsed time (PoET) algorithm.

According to various embodiments of the present invention, the nodes in the blockchain network 400 may operate due to a blockchain core package based on a hierarchical structure. The hierarchical structure may include a data layer for defining the structure of data handled in the blockchain network 400 and managing the data, a consensus layer for verifying the validity of a block, mining to generate a block, and processing fees paid to miners for the mining process, an execution layer for processing and executing a smart contract, a common layer for implementing and managing a peer-to-peer (P2P) network protocol, hash functions, electronic signatures, encoding, and a common storage, and an application layer for generating, processing, and managing various applications.

The wired/wireless communication network 500 provides a communication path in which the creator terminal 100, the user terminals 300 (300-1, 300-2, . . . , and 300-n), and the blockchain network 400 may transmit and receive signals and data to and from each other. The wired/wireless communication network 500 is not limited to a communication method based on a specific communication protocol, and an appropriate communication method may be used for an implementation example. For example, when the system is based on the Internet protocol (IP), the wired/wireless communication network 500 may be implemented as a wired/wireless Internet network, and the creator terminal 100, the user terminals 300 (300-1, 300-2, . . . , and 300-n), and the blockchain network 400 may be implemented as a wireless network such as a cellular network or wireless local area network (WLAN).

Figure 2:
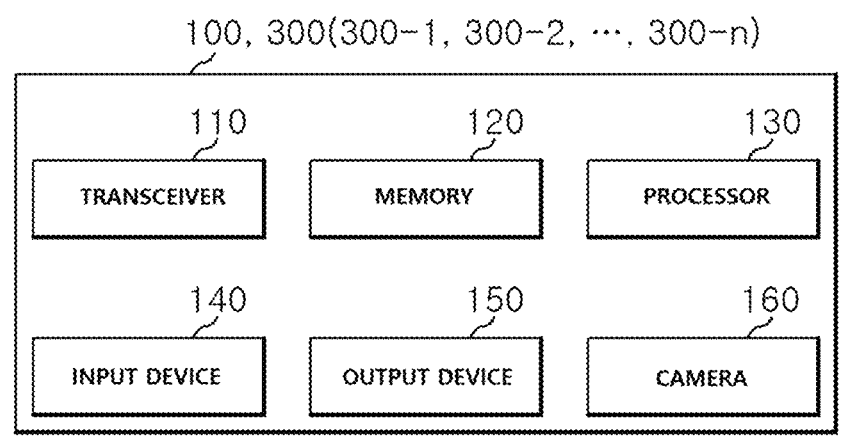
FIG. 2 is a block diagram of a creator terminal and a user terminal according to various embodiments of the present invention.

FIG. 2 is a block diagram of a creator terminal and a user terminal according to various embodiments of the present invention.

Referring to FIG. 2, each of the creator terminal 100 and the user terminals 300 (300-1, 300-2, . . . , and 300-n) according to various embodiments of the present invention includes a transceiver 110, a memory 120, a processor 130, an input device 140, an output device 150, and a camera 160.

The transceiver 110 is connected to the processor 130 and transmits and/or receives a signal. All or a part of the transceiver 110 may be referred to as "transmitter," "receiver," or "transceiver." The transceiver 110 may support at least one of various wireless communication standards such as an Institute of Electrical and Electronics Engineers (IEEE) 802.xx system, an IEEE Wi-Fi system, a Third Generation Partnership Project (3GPP) system, a 3GPP Long Term Evolution (LTE) system, a 3GPP fifth generation (5G) New Radio (NR) system, a Third Generation Partnership Project 2 (3GPP2) system, Bluetooth, and the like which are wired access systems and wireless access systems.

The memory 120 may be connected to the transceiver 110, the processor 130, the input device 140, and the output device 150 and may store information input through the input device 140, information received through communication of the transceiver 110, and the like. Also, the memory 120 may store information on images captured by the camera 160 and the like. Further, the memory 120 may be connected to the processor 130 and store data such as a basic program, an application program, and setting information for operation of the processor 130, information generated through computation of the processor 130, and the like. The memory 120 may be configured as a volatile memory, a non-volatile memory, or a combination thereof. The memory 120 may provide stored data according to a request of the processor 130.

The processor 130 may be configured to implement procedures and/or methods proposed in the present invention. The processor 130 controls overall operations of the creator terminal 100 or the user terminals 300 (300-1, 300-2, . . . , and 300-n). For example, the processor 130 transmits or receives information and the like through the transceiver 110. The processor 130 writes and reads data to and from the memory 120. The processor 130 receives information through the input device 140. The processor 130 outputs information through the output device 150. The processor 130 captures images through the camera 160. The processor 130 may include at least one processor.

The input device 140 may be connected to the processor 130 and may input information and the like. According to an embodiment, the input device 140 may input information and the like received through the transceiver 110 from another device connected to the wired/wireless communication network 500. The input device 140 may include a touch display, a keypad, a keyboard, or the like.

The output device 150 may be connected to the processor 130 and may output information and the like in the form of an image, voice, and the like. According to an embodiment, the output device 150 may output information and the like received through the transceiver 110 from another device connected to the wired/wireless communication network 500. The output device 150 may include a display, a speaker, and the like.

The camera 160 may be connected to the processor 130 and may capture an image of an object in front of the camera 160.

Figure 3:
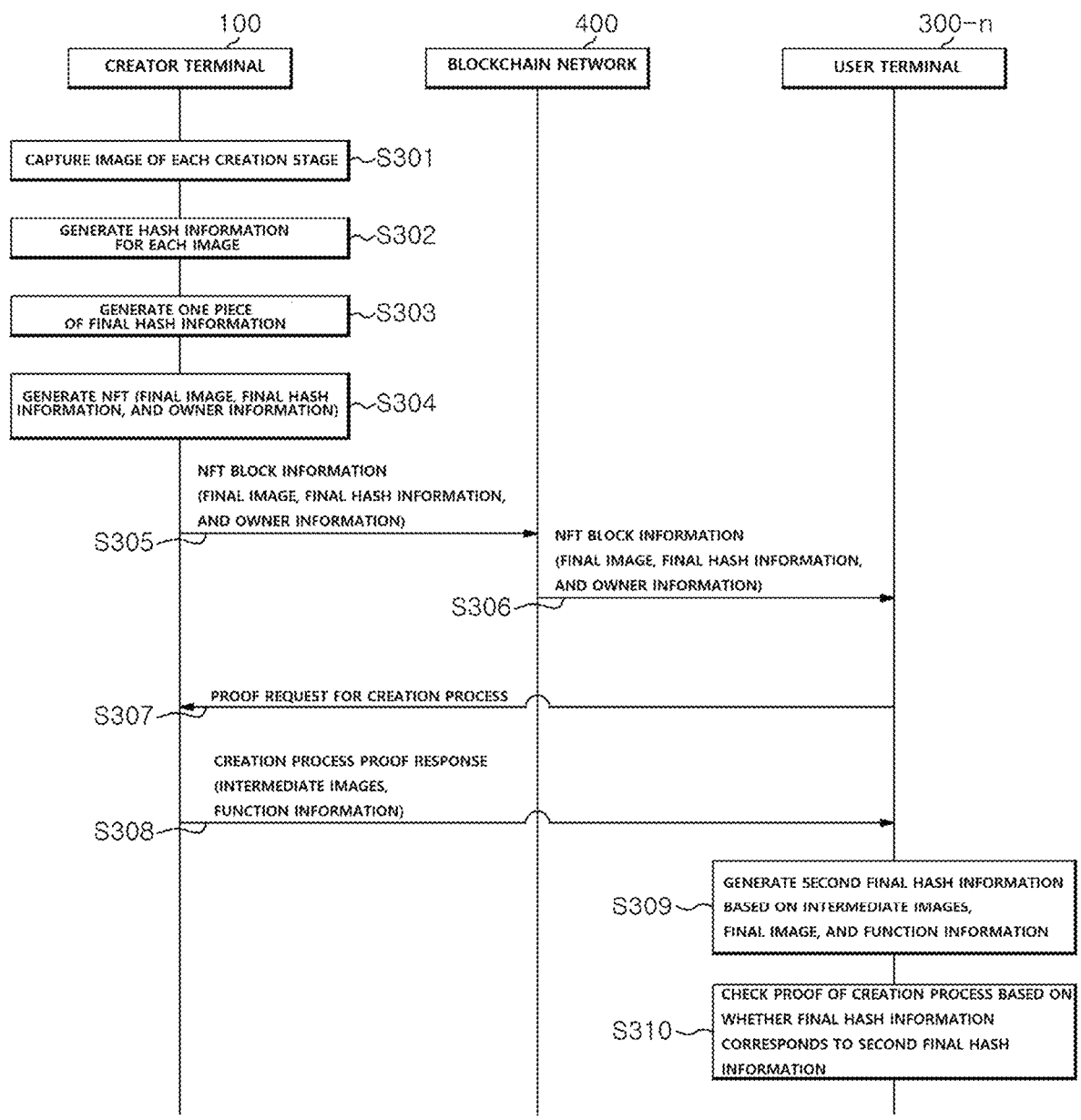
FIG. 3 is a signal sequence diagram of a system according to various embodiments of the present invention.

FIG. 3 is a signal sequence diagram of a system according to various embodiments of the present invention.

In operation S301, the creator terminal 100 captures a plurality of intermediate images in the creation stages of a design and one final image using the camera of the creator terminal 100. The plurality of intermediate images are captured during the creation times of the creation stages of the design, and the final image is captured during the final creation time of the design.

In operation S302, the creator terminal 100 generates a plurality of pieces of intermediate image hash information corresponding to the plurality of intermediate images and final image hash information corresponding to the final image through the processor thereof using a first function stored in the memory thereof.

In operation S303, the creator terminal 100 generates final hash information based on the plurality of pieces of intermediate image hash information and the final image hash information through the processor thereof using a second function stored in the memory.

In operation S304, the creator terminal 100 generates first block information about a first non-fungible token (NFT) based on information related to the first terminal, information on the final image, and the final hash information through the processor thereof. The information related to the first terminal corresponds to owner information of the first NFT.

In operation S305, the creator terminal 100 transmits the first block information to the blockchain network 400 through the transceiver thereof. Unlike other intellectual property rights, such as patents and trademarks, copyright does not require any formalities, such as registration, publication, and the like, and is obtained at the time of creation. Therefore, even when a creator releases a final image to a number of unspecified people through a blockchain, it does not mean that intermediate images which have not been released are not copyrighted. Only a final image that a creator wants to release to a number of unspecified people is released, but an NFT is generated to include final hash information generated on the basis of intermediate images, which are created in the creation process of the final image designated by the creator. Accordingly, in a dispute that may arise in the future, it is possible to show evidence of the creation of the intermediate images in the creation process of the final image.

In operation S306, the third-party terminal 300-1, 300-2, . . . , or 300-n which is one of the plurality of nodes constituting the blockchain network 400 receives the first block information from the blockchain network through the transceiver thereof.

In operation S307, the third-party terminal 300-1, 300-2, . . . , or 300-n transmits a proof request message for the plurality of intermediate images generated in the creation process of the final image corresponding to the first NFT through the transceiver thereof on the basis of the owner information of the first NFT in the first block information.

In operation S308, the creator terminal 100 transmits a proof response message including information on the plurality of intermediate images, information on the first function, and information on the second function to the third-party terminal 300-1, 300-2, . . . , or 300-n through the transceiver thereof. The third-party terminal 300-1, 300-2, . . . , or 300-n corresponds to a specified person rather than a number of unspecified people in the blockchain. The creator terminal 100 may transmit the intermediate images to the specified person according to the creator's intention.

According to various embodiments of the present invention, the second function may be configured to generate the final hash information differently depending on the order of computation of the plurality of pieces of intermediate image hash information and the final image hash information input thereto. The order of computation may be based on the order in which the plurality of intermediate images and the final image are created. The proof response message may further include information on the order of computation. The information on the order of computation may notify the third-party terminal 300-1, 300-2, . . . , or 300-n of the order in which the plurality of intermediate images and the final image were created.

In operation S309, the third-party terminal 300-1, 300-2, . . . , or 300-n generates second final hash information on the basis of the information on the final image corresponding to the first NFT in the first block information, the received information on the plurality of intermediate images, the information on the first function, and the information on the second function.

In operation S310, the third-party terminal 300-1, 300-2, . . . , or 300-n checks the proof that the plurality of intermediate images were created during the creation process of the final image on the basis of whether the final hash information corresponding to the first NFT in the first block information corresponds to the second final hash information generated in operation S309.

Figure 4:
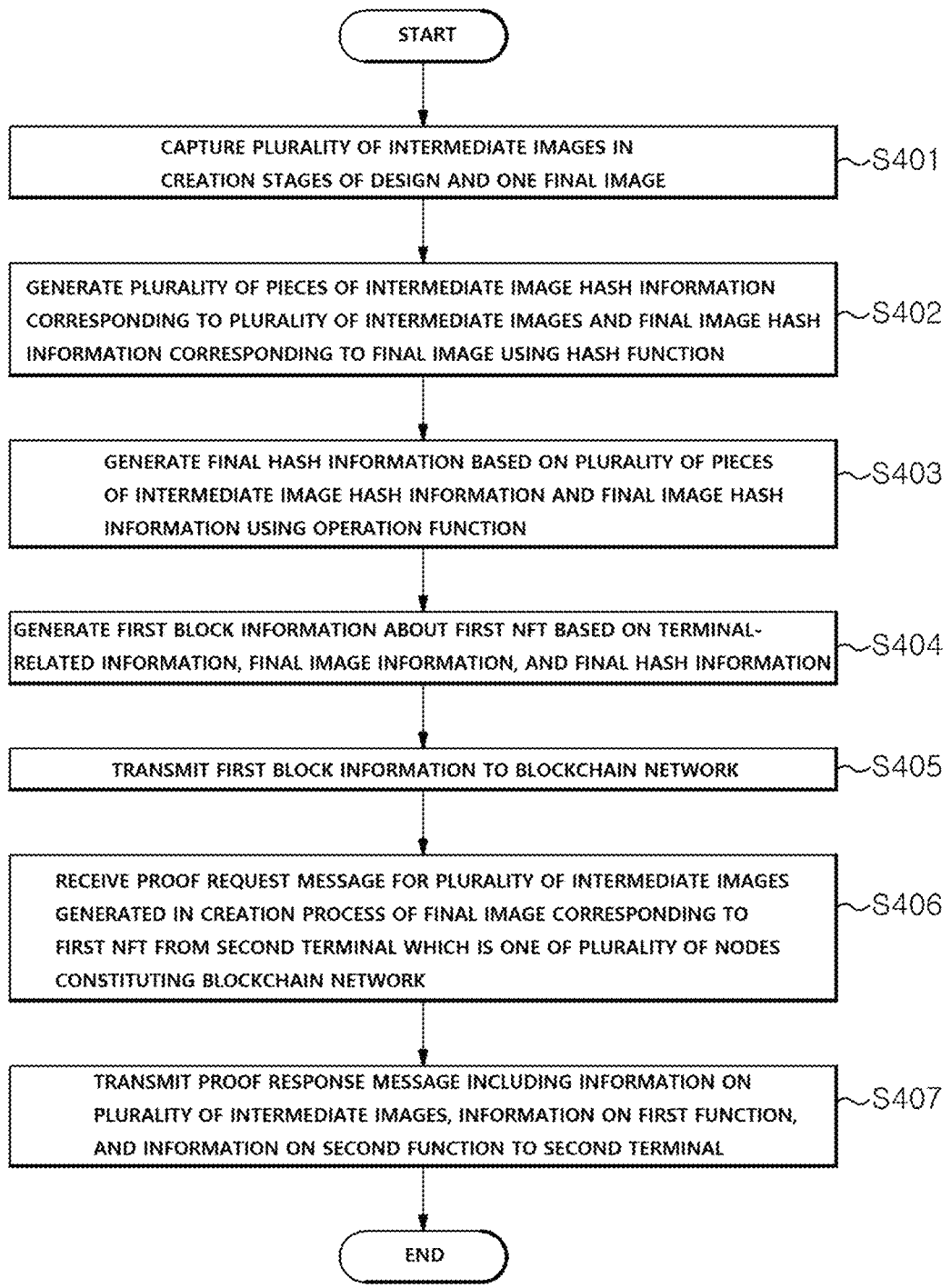
FIG. 4 is a flowchart illustrating an operating process of a creator terminal according to various embodiments of the present invention.

FIG. 4 is a flowchart illustrating an operating process of a creator terminal according to various embodiments of the present invention.

In the embodiment of FIG. 4, a first terminal is a creator terminal, which includes a transceiver, a memory, a processor, an input device, an output device, and a camera.

Referring to FIG. 4, in operation S401, the first terminal captures a plurality of intermediate images in creation stages of a design and one final image through the camera. The plurality of intermediate images are captured during the creation times of the creation stages. The final image is captured during the final creation time of the design.

In operation S402, the first terminal generates a plurality of pieces of intermediate image hash information corresponding to the plurality of intermediate images and final image hash information corresponding to the final image through the processor thereof using a first function stored in the memory. As an example of the first function, a secure hash algorithm (SHA) such as SHA-256, SHA-512, or the like may be used. The first function may correspond to one of the image hash functions of FIGS. 5 to 8. The foregoing hash functions are illustrative, and the first function is not limited thereto. The first function may correspond to one of various other hash functions.

In operation S403, the first terminal generates final hash information based on the plurality of pieces of intermediate image hash information and the final image hash information through the processor using a second function stored in the memory. As an example of a second function, an SHA such as SHA-256, SHA-512, or the like may be used. The foregoing hash functions are illustrative, and the second function is not limited thereto. The second function may correspond to one of various other hash functions. As an example, the second function may correspond to a combination of logical operations. Examples of logical operations are AND, NOT, NAND, NOR, and the like. The second function may be configured to output a different result value according to the order in which the same input values are input.

In operation S404, the first terminal generates first block information about a first NFT based on information related thereto, information on the final image, and the final hash information through the processor thereof. The information related to the first terminal corresponds to owner information of the first NFT.

In operation S405, the first terminal transmits the first block information to a blockchain network through the transceiver.

In operation S406, the first terminal receives a proof request message for the plurality of intermediate images generated in the creation process of the final image corresponding to the first NFT from a second terminal, which is one of a plurality of nodes constituting the blockchain network, through the transceiver.

In operation S407, the first terminal transmits a proof response message including information on the plurality of intermediate images, information on the hash function, and information on the operation function to the second terminal through the transceiver.

According to various embodiments of the present invention, operation S402 of generating the plurality of pieces of intermediate image hash information corresponding to the plurality of intermediate images and the final image hash information corresponding to the final image through the processor thereof using the first function stored in the memory may include an operation in which the processor extracts a plurality of pieces of binary metadata from the plurality of intermediate images and the final image and an operation of inputting the plurality of pieces of binary metadata to the hash function of the first function to generate the plurality of pieces of intermediate image hash information and the final image hash information.

According to various embodiments of the present invention, the plurality of pieces of binary metadata may correspond to binary data of metadata of the plurality of intermediate images and the final image, and the metadata may include camera information and imaging time information of the plurality of intermediate images and the final image.

According to various embodiments of the present invention, the second function may be configured to generate the final hash information differently depending on the order of computation of the plurality of pieces of intermediate image hash information and the final image hash information. The order of computation may be based on the order in which the plurality of intermediate images and the final image are created. The proof response message may further include information on the order of computation. The information on the order of computation may notify the second terminal of the order in which the plurality of intermediate images and the final image were created.

According to various embodiments of the present invention, the second function may be a hash function to which a plurality of input values may be sequentially input and output a different result value depending on the order of a plurality of input values. For example, when a plurality of pieces of intermediate image hash information are $h_1$, $h_2$, . . . , and $h_{n-1}$ and final image hash information is $h_n$, $H(h_1, h_2, \ldots, h_{n-1}, h_n) = h_{n+1}$ may be obtained. H corresponds to the second function of the hash function, and $h_{n+1}$ may correspond to final hash information. The order in which the plurality of pieces of intermediate image hash information $h_1$, $h_2$, . . . , and $h_{n-1}$ and the final image hash information $h_n$ are input to the second function H may be determined according to the order in which the plurality of intermediate images and the final image were created. When the user of the first terminal who is a creator determines the order in which $h_1$, $h_2$, . . . , $h_{n-1}$, $h_n$ are input to the second function H and notifies the second terminal of the input order, it is possible to prove the order in which the plurality of intermediate images and the final images were created.

According to various embodiments of the present invention, the embodiment of FIG. 4 may further include an operation in which, immediately after the plurality of intermediate images are captured, the processor generates a plurality of pieces of second block information about a plurality of second NFTs encrypted on the basis of the plurality of intermediate images using a first encryption key and an operation in which, immediately after the plurality of pieces of second block information are generated, the transceiver transmits each of the plurality of pieces of second block information to the blockchain network. According to various embodiments of the present invention, the proof response message may further include information related to the plurality of second NFTs, information on a second encryption key for decrypting the plurality of NFTs, and information on the creation time of each of the plurality of intermediate images based on the time at which each of the plurality of pieces of second block information is transmitted to the blockchain network.

According to various embodiments of the present invention, the embodiment of FIG. 4 may further include an operation in which, immediately after the plurality of intermediate images are captured, the processor generates the plurality of pieces of intermediate image hash information about the plurality of intermediate images and a plurality of pieces of second block information on the basis of the plurality of pieces of intermediate image hash information using the first function and an operation in which, immediately after the plurality of pieces of second block information are generated, the transceiver transmits each of the plurality of pieces of second block information to the blockchain network. According to various embodiments of the present invention, the proof response message may further include information related to the plurality of pieces of second block information and information on the creation time of each of the plurality of intermediate images based on the time at which each of the plurality of pieces of second block information is transmitted to the blockchain network.

According to various embodiments of the present invention, the memory may store a plurality of image hash functions and a plurality of operation functions. The plurality of pieces of intermediate image hash information and the final image hash information may be generated using the first function which is one of the plurality of image hash functions randomly selected by the processor. The final hash information may be generated using the second operation function which is one combination randomly selected by the processor from among combinations of the plurality of logical operations. According to various embodiments of the present invention, the plurality of hash functions may include one or more of the image hash functions of FIGS. 5 to 8.

According to various embodiments of the present invention, the second function may be a combination of a plurality of logical operations. Examples of logical operations are AND, NOT, NAND, NOR, and the like. The second function may output a different result value according to the computation order of a combination of logical operations.

According to various embodiments of the present invention, the memory may store a plurality of first functions and a plurality of second functions. The plurality of pieces of intermediate image hash information and the final hash information may be generated using one of the plurality of first functions selected according to a first input signal of a user which is input through the input device.

The final hash information may be generated using one of the plurality of second functions selected according to a second input signal of the user which is input through the input device.

According to various embodiments of the present invention, the first terminal in the communication system includes a transceiver, a memory, a processor, an input device, an output device, and a camera, and the processor is configured to perform the operating method of the first terminal according to the embodiment of FIG. 4.

According to various embodiments of the present invention, a computer program is configured to perform the operating method of the first terminal according to the embodiment of FIG. 4 and recorded on a computer-readable storage medium.

FIG. 5 shows examples of image hash functions that are applicable to an image according to various embodiments of the present invention.

FIG. 5 illustrates an average hash algorithm and a block hash algorithm as examples of image hash functions that are applicable to images.

According to the average hash algorithm, a source image is converted into grayscale and then scaled down. For example, the image is scaled down to 8×8 pixels to generate 64-bit hash. Subsequently, the average of all gray values of the image is calculated, and then pixels are checked one by one from left to right. When a gray value is larger than the average, 1 is added to the hash, and otherwise, 0 is added to the hash. When the average hash algorithm is applied to the example source image of FIG. 5, the hash code (i.e., hash information) of 0000000000010000000000000100000010000101000011 0111111111111110 is generated.

According to the block hash algorithm, a source image is divided into blocks, and a value of 1 or 0 is generated for each block. These values are sequentially combined into hash from left to right. Since 64-bit hash is necessary, the image is divided into 64 blocks. When the block hash algorithm is applied to the example source image of FIG. 5, the hash code (i.e., hash information) of 0011100010011100000011100110001101000011100001110100001011100110 is generated.

FIG. 6 shows examples of image hash functions that are applicable to an image according to various embodiments of the present invention.

FIG. 6 illustrates a difference hash algorithm and a median hash algorithm as examples of image hash functions that are applicable to images.

According to the difference hash algorithm, like the average hash algorithm, a grayscale image is generated from a source image and scaled down to 9×8 pixels. In each row, the first eight pixels are sequentially checked from left to right, and 64-bit hash is generated like the average hash algorithm. When the difference hash algorithm is applied to the example source image of FIG. 6, the hash code (i.e., hash information) of 1111000000110000101110001100111010000110010011001000111010001110 is generated.

The median hash algorithm works similarly to the average hash algorithm except that each pixel is compared with the median instead of the average. When the median hash algorithm is applied to the example source image of FIG. 6, the hash code (i.e., hash information) of 00000000100111000001100001100011010000101000011111111111111111 is generated.

FIG. 7 shows an example of an image hash function that is applicable to an image according to various embodiments of the present invention.

FIG. 7 illustrates a perceptual hash algorithm as an example of an image hash function that is applicable to images.

According to the perceptual hash algorithm, a grayscale image is calculated first and scaled down. In the example of FIG. 6, a factor of 4 is wanted, and thus the grayscale image is scaled down to an 8*4×8*4, that is, 32×32, image. A discrete cosine transform is applied to the image in rows and then columns.

The discrete cosine transform is as follows:

$$X_k = \sum_{n=0}^{N-1} 2n * \cos\left(\Pi * k * \frac{2n+1}{2N}\right) \forall k \in [0, N]$$

Since pixels with a high frequency are now located at the upper left corner, 8×8 pixels of the upper left corner are cropped from the image. Subsequently, the median of grayscale values of the image is calculated, and a hash value is generated from the image like the median hash algorithm.

When the perceptual hash algorithm is applied to the example source image of FIG. 7, the hash code (i.e., hash information) of 1010010010101101100110011011001101100010100100000111011010101110 is generated.

Figure 8:
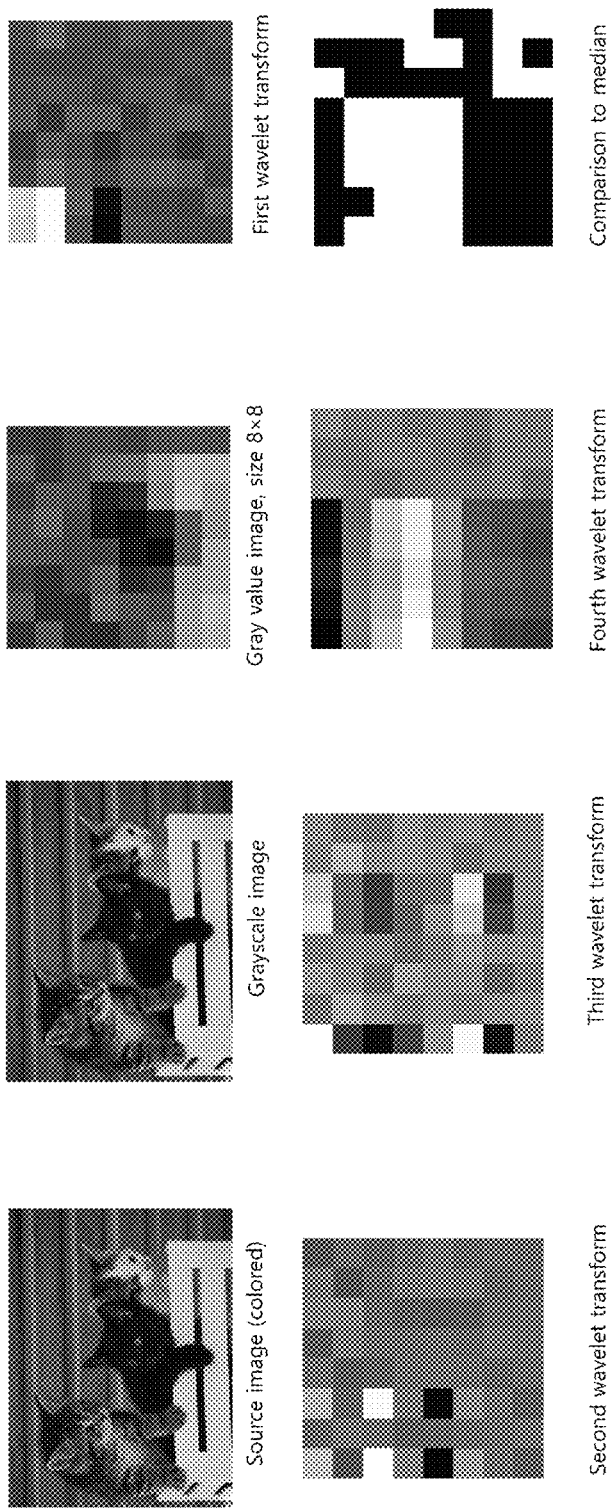
FIG. 8 shows an example of an image hash function that is applicable to an image according to various embodiments of the present invention.

FIG. 8 shows an example of an image hash function that is applicable to an image according to various embodiments of the present invention.

FIG. 8 illustrates a wavelet hash algorithm as an example of an image hash function that is applicable to images.

According to the wavelet hash algorithm, like the average hash algorithm, an 8×8 size grayscale image is generated. Subsequently, a two-dimensional (2D) wavelet transform is applied to the image. According to test results, when the uppermost row was set to 0, that is, black, and a wavelet transform was applied three times, the result was improved. Subsequently, like the perceptual hash algorithm, each pixel is compared with the median, and a hash is calculated.

When the wavelet hash algorithm is applied to the example source image of FIG. 8, the hash code (i.e., hash information) of 0000010110111001111110011111101111111010000000000000011100000101 is generated.

Figure 9:
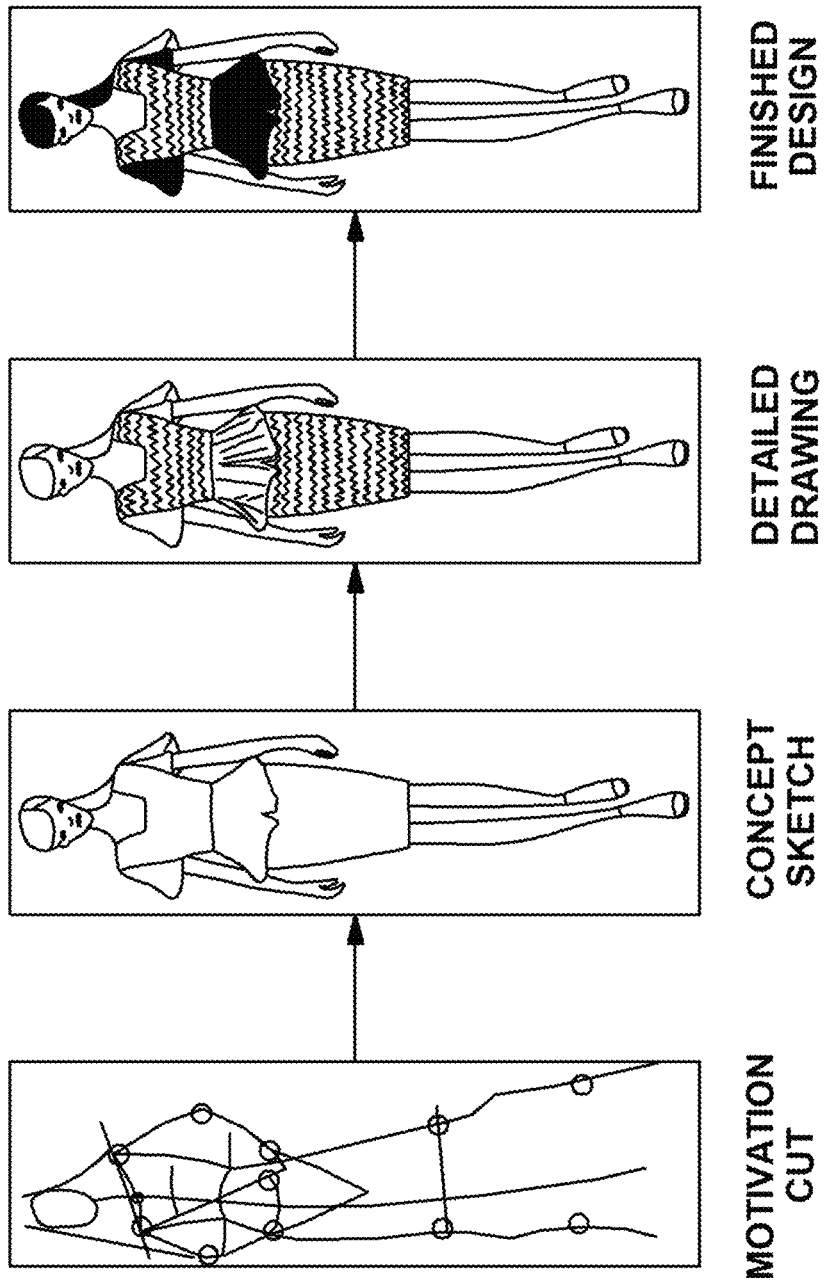
FIG. 9 shows examples of creation stage-specific creative designs according to various embodiments of the present invention.

FIG. 9 shows examples of creation stage-specific creative designs according to various embodiments of the present invention.

Referring to FIG. 9, images of four stages are shown as illustrative creation stage-specific creative designs. A motivation cut corresponds to an image that reflects initial inspiration or motivation of a creative design. A concept sketch corresponds to an image that represents the concept of the creative design. A detailed drawing corresponds to an image that shows specific details of the creative design. A finished design corresponds to a final image that is finished enough to be applied to a product. According to various embodiments of the present invention, creation stage-specific creative designs may include a captured image of a hand-drawn drawing and various forms of design images, such as a screenshot, a saved image file, or the like in the case of using a computer design program. According to various embodiments of the present invention, creation stage-specific creative designs may include various design features such as the composition of a design, the placement of each design element, a weave design for fabric, the shapes and locations of buttons, and the like.

A creator can prove the direct causal relationship of the creative design by sharing information on the creation stage-specific creative designs of FIG. 9 through a blockchain network.

By issuing NFTs for creative design images corresponding to a set number of stages as illustrated in FIG. 9 to disclose the creation process of the creative design, the creator can prove that the creator who is the owner of the NFTs created the creation stage-specific creative designs which are the content of the NFTs.

Also, a creator may combine hash codes for intermediate images in the creation process of a creative design, such as a painting, an art work, a commercial or non-commercial design, or the like, and a hash code for a final image using an operation function to generate one piece of final hash information and then transmit an NFT including the final hash information and information on the final image to a blockchain. In this way, the design creator can claim the relationship between the intermediate images in the creation process of the creative design and the final image at the time of disclosing the design on the blockchain network. After that, when there is a problem with the creation process of the final image, the creator can prove the originality of the creative design from the creation process.

Figure 10:
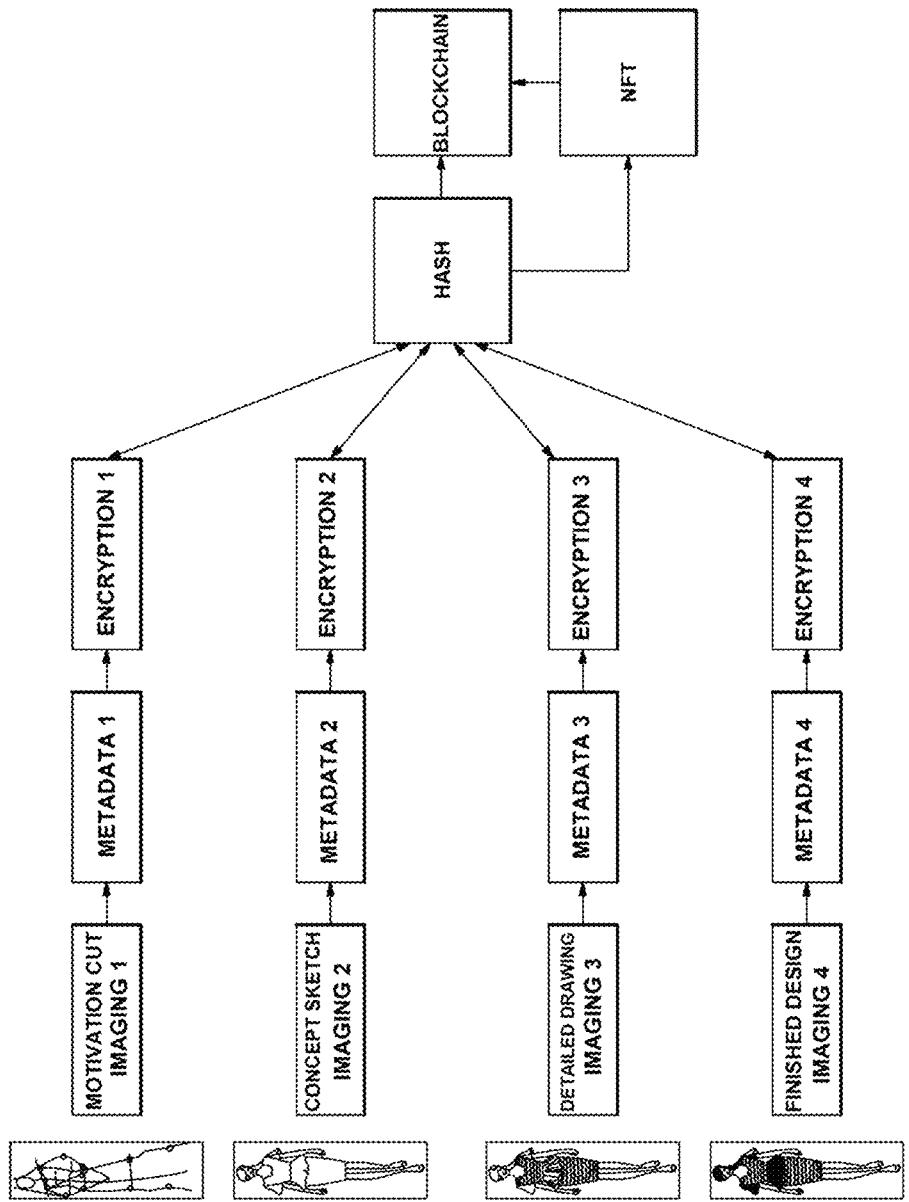
FIG. 10 is a diagram illustrating a non-fungible token (NFT) generation process based on creation stage-specific creative designs according to various embodiments of the present invention.

FIG. 10 is a diagram illustrating an NFT generation process based on creation stage-specific creative designs according to various embodiments of the present invention.

Referring to FIG. 10, a process of generating metadata from creation stage-specific creative images, encrypting the generated metadata, and generating hash information on the basis of the encrypted image information is shown.

The generated hash information may be immediately transmitted to a blockchain network as block information and shared among nodes sharing the blockchain. Also, an NFT may be generated on the basis of the hash information, and then the hash information may be transmitted to the blockchain network in the form of the NFT.

Both hash information and an NFT only include image information which was encrypted using an encryption key. After that, when the creator transmits information on the encryption key to the blockchain network at a point in time that the creator wants to make the design public, nodes connected to the blockchain may decrypt the encrypted images using the encryption key and then view the images.

Since there are timestamps for dates of capturing the images in the image information and information on the time at which the hash information or NFT is shared in the blockchain network, it is possible to prove information on the creation time of each creation stage-specific creative image to prove the originality of the creation stage-specific creative image.

Figure 11:
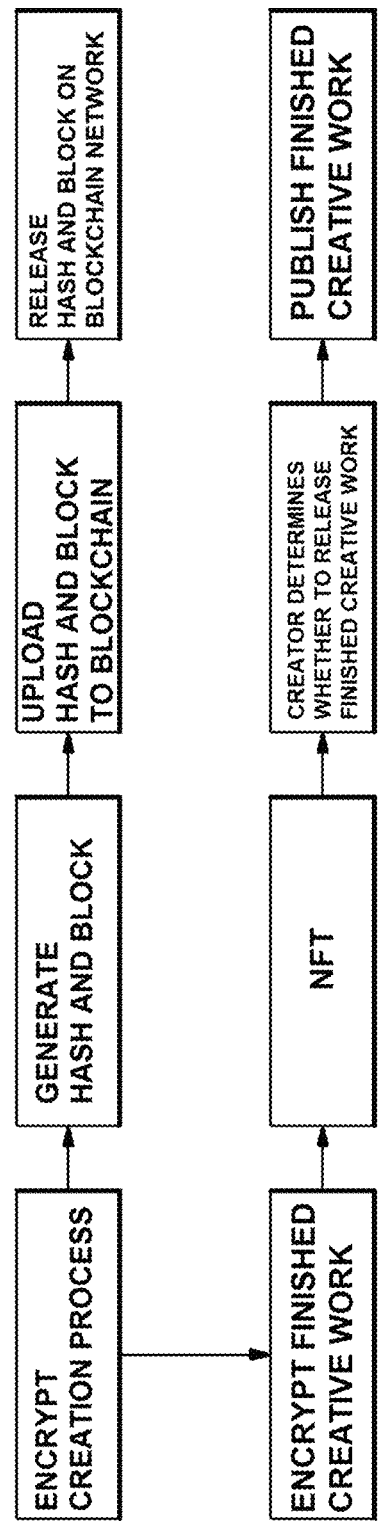
FIG. 11 is a diagram illustrating an NFT generation and publishing process based on creation stage-specific creative designs according to various embodiments of the present invention.

FIG. 11 is a diagram illustrating an NFT generation and publishing process based on creation stage-specific creative designs according to various embodiments of the present invention.

Referring to FIG. 11, after a design is created, creation stage-specific images may be captured and then immediately encrypted. Also, a hash and block information may be generated, and the generated hash and block information may be uploaded to a blockchain network and released on the blockchain network.

Also, after the creation is finished, a plurality of selected creation stage-specific images may be encrypted, and then an NFT may be generated. The NFT may be shared among nodes through the blockchain. Since the creator is set as the owner of the NFT, it is possible to prove that the creator is the original creator of the creative design through the proof of ownership of the NFT. The creator may upload the NFT including the encrypted images to the blockchain and then upload information on a key for decrypting the encryption to the blockchain at the time point of release wanted by the creator. In this way, by initially uploading the NFT, it is possible to set a time point wanted by the creator as the time point of release while proving the time point of creation. After that, while publishing a second NFT on the basis of the creative image, it is possible to set the second NFT to include the NFT including the initially encrypted creative design and the information on the decryption key as associated information.

Further, for each of a product with a creative design, a licensee who has a license agreement with a creator for the creative design, and a product produced by the licensee, a third NFT may be newly generated and issued to prove whether the creative design has been applied, whether the licensee is legally licensed to use the design, and whether the licensee has produced the product. The issued third NFT may be configured to include the NFT including the initially encrypted creative design and the information on the decryption key.

Figure 12:
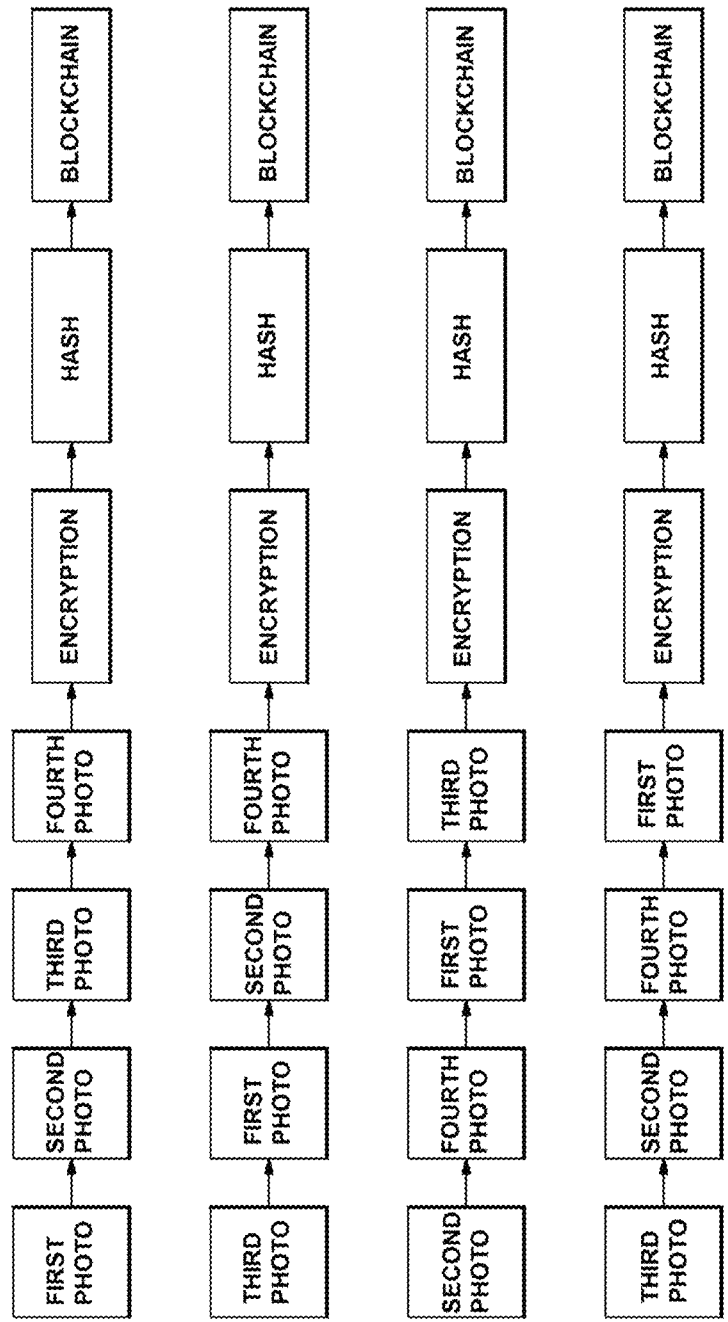
FIG. 12 is a diagram illustrating a process of generating and uploading encrypted information based on creation stage-specific creative designs to a blockchain according to various embodiments of the present invention.

FIG. 12 is a diagram illustrating a process of generating and uploading encrypted information based on creation stage-specific creative designs to a blockchain according to various embodiments of the present invention.

Referring to FIG. 12, the order in which creation process images of creation-process designs are encrypted may be determined by the creator or may be randomly determined by a computer. Accordingly, selected creation stage-specific images 1, 2, 3, and 4 may be sequentially encrypted or may be encrypted in a random sequence such as 2, 3, 1, and 4. With such irregularity in encryption order, it is possible to achieve a higher security level.

Figure 13:
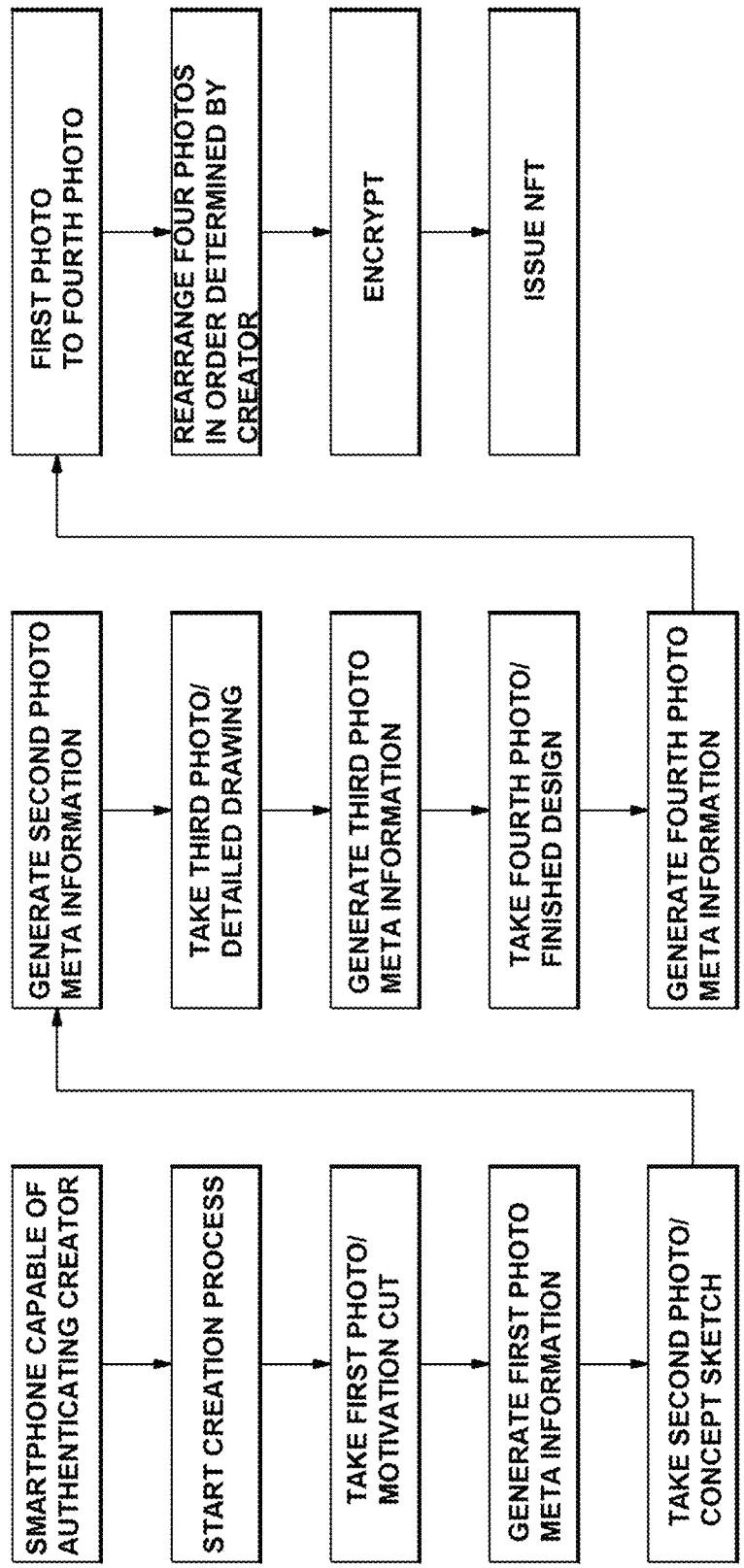
FIG. 13 is a diagram illustrating a process of generating and uploading an encrypted NFT based on creation stage-specific creative designs to a blockchain according to various embodiments of the present invention.

FIG. 13 is a diagram illustrating a process of generating and uploading an encrypted NFT based on creation stage-specific creative designs to a blockchain according to various embodiments of the present invention.

Referring to FIG. 13, a creator may capture images of creation stage-specific designs during a creation process and prove the creation time of each intermediate design in the creation process using timestamp information about the time points at which the images were captured.

The creator may select a plurality of images that may represent the development of the creation process from among multiple images captured during the creation process. Although the images of four intermediate designs are illustrated in the drawing of the present invention, the number of images is a mere example and is not limited to four.

Each of the intermediate designs may correspond to one of a motivation cut, a concept sketch, a detailed drawing, and a finished design.

After the image of each intermediate design is captured, metainformation about each image may be generated. The metainformation may include information on a person who captured the image, that is, the creator. Also, the metainformation may include timestamp information about the time at which the image was captured. In addition, the metainformation may include Global Positioning System (GPS) information about the location at which the image was captured.

Information on the plurality of images may be rearranged irrespective of time in an order determined by the creator or a computer-based random function. The plurality of rearranged images may be encrypted, and an NFT may be generated for the encrypted information. Alternatively, encryption may be performed in the creation order, that is, an order in which the photograph images were generated, and an NFT may be generated for the encrypted information.

The generated NFT may be transmitted to a blockchain network to issue the NFT.

Multiple nodes constituting the blockchain network may receive the NFT but are not aware of the creative designs because the nodes access only the encrypted images without a key for decryption.

Subsequently, the creator transmits information on the key for decryption to the blockchain network at the time point of release set by the creator so that the multiple nodes can decrypt the encrypted images in the NFT and view the images.

The creator can prove the originality by proving the creation times of the creation stage-specific designs and proving that he or she is the creator of the creation stage-specific designs using the metainformation of the images in the NFT.

A creator may capture a plurality of images of intermediate images during the creation process of a design using his or her terminal device, such as a smartphone or the like, functionalize the metainformation of each image file, and generate one hash code on the basis of the functions. The creator may upload the hash code to a blockchain network and generate an NFT from a finished final image to prove the causal relationship between the creator and creative designs.

While hash values of the creative designs are transmitted to the blockchain network, a closed NFT may be generated from the final image of the creative designs, and whether to release the closed NFT may be determined by the creator. Therefore, before the images of the creative designs are released, the hash values for proving the creation process of the creative designs may be transmitted to the blockchain, and then the time point at which the hash values were transmitted may be proved so that the originality of the intermediate images in the creation process can be proved. Since the creation process is recorded in the creator's terminal and log information about the transmission of the final hash value remains in the creator's terminal, it is possible to prove the originality of the creative designs without releasing the image of the final creative design. In other words, the hash values are transmitted and released to the blockchain network, but the finished image of which the causal relationship has been proved may be stored in the creator's terminal.

Figure 14:
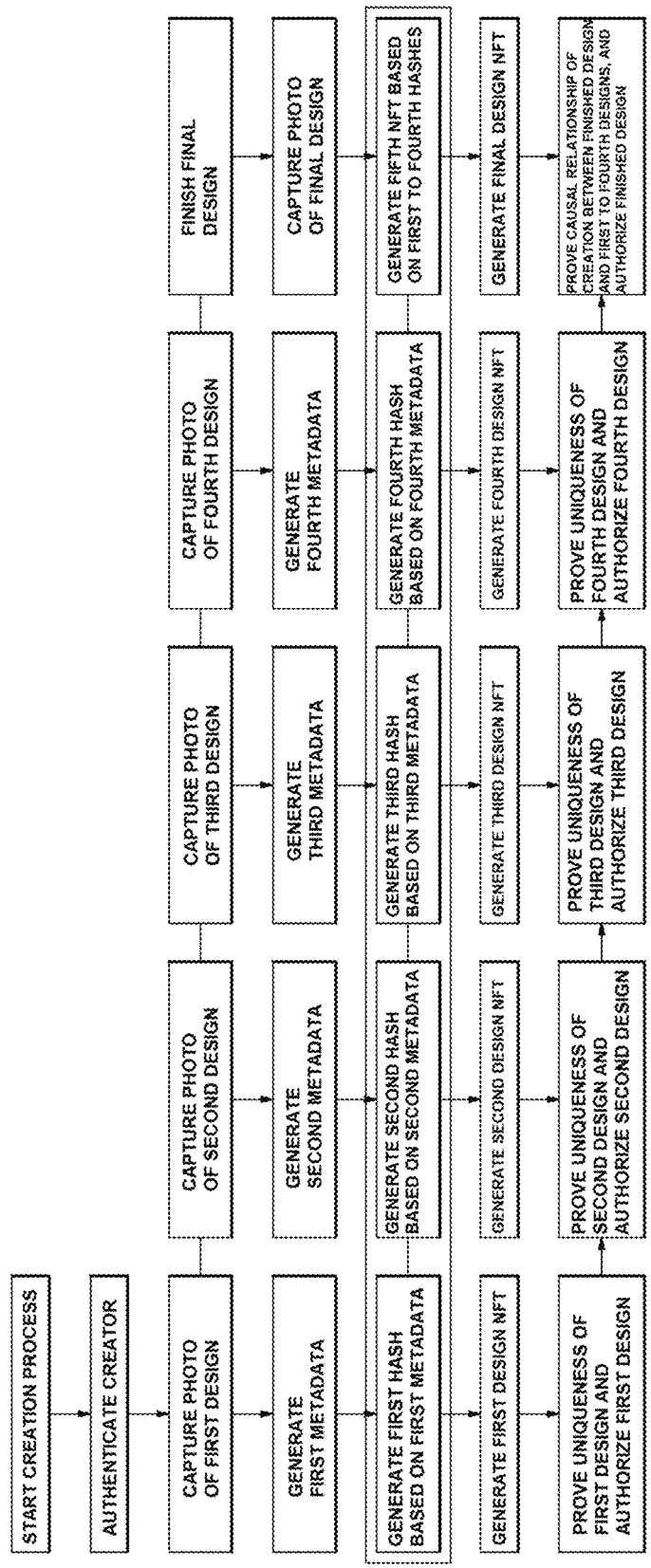
FIG. 14 is a diagram illustrating a process of generating and uploading NFTs based on creation stage-specific creative designs to a blockchain according to various embodiments of the present invention.

FIG. 14 is a diagram illustrating a process of generating and uploading NFTs based on creation stage-specific creative designs to a blockchain according to various embodiments of the present invention.

FIG. 14 shows an illustrative process for proving the causality between creation process images and a final image according to various embodiments of the present disclosure. The entire process of the embodiment of FIG. 14 may be performed by a creator using a creator terminal. The creator terminal is a computing device capable of wired and wireless communication such as a personal computer (PC), a smartphone, a tablet computer, or the like.

Referring to FIG. 14, every time each of intermediate designs including a first design, a second design, a third design, and a fourth design is created after a creation work, the creator authenticates himself or herself through an application and then captures photographs or digital images of the intermediate designs. Since the photograph or digital image of each intermediate design is captured immediately after the intermediate design is created, the photograph or digital image is assumed to be captured at the time point at which the intermediate design is created.

First metadata, second metadata, third metadata, and fourth metadata are generated for the intermediate designs by photographing intermediate designs or capturing the images of the intermediate designs.

A first hash, a second hash, a third hash, and a fourth hash are generated on the basis of the first metadata, the second metadata, the third metadata, and the fourth metadata, respectively.

According to the creator's selection, a first design NFT, a second design NFT, a third design NFT, and a fourth design NFT are generated by photographing each of the intermediate designs or capturing the image of each intermediate design. According to the creator's selection, the first design NFT, the second design NFT, the third design NFT, and the fourth design NFT may be uploaded to a blockchain network. According to the creator's selection, the first design NFT, the second design NFT, the third design NFT, and the fourth design NFT may be generated on the basis of encrypted image information of the photograph or captured image of each of the intermediate designs. According to the creator's selection, each of the intermediate designs may or may not be made public.

After the creation process of a final design based on the intermediate designs is finished, the creator photographs the finished final design or captures a digital image thereof. A fifth hash is generated on the basis of the first hash, the second hash, the third hash, and the fourth hash of the intermediate designs.

The creator generates a final design NFT on the basis of the photograph or captured digital image of the final design and the fifth hash. The final design NFT includes information on the creator or information on the creator terminal as NFT owner information. The final design NFT is uploaded to the blockchain network.

When the final design NFT is uploaded to the blockchain network, the image of the final design and the fifth hash are shared among a plurality of nodes constituting the blockchain network.

After that, when the creator or creator terminal receives a request for the creation process of the final design from someone, the creator can prove that the final design was created from the first design, the second design, the third design, and the fourth design by proving that the fifth hash was generated from the first hash, the second hash, the third hash, and the fourth hash and proving that the first hash, the second hash, the third hash, and the fourth hash were generated from the first design, the second design, the third design, and the fourth design.

Figure 15:
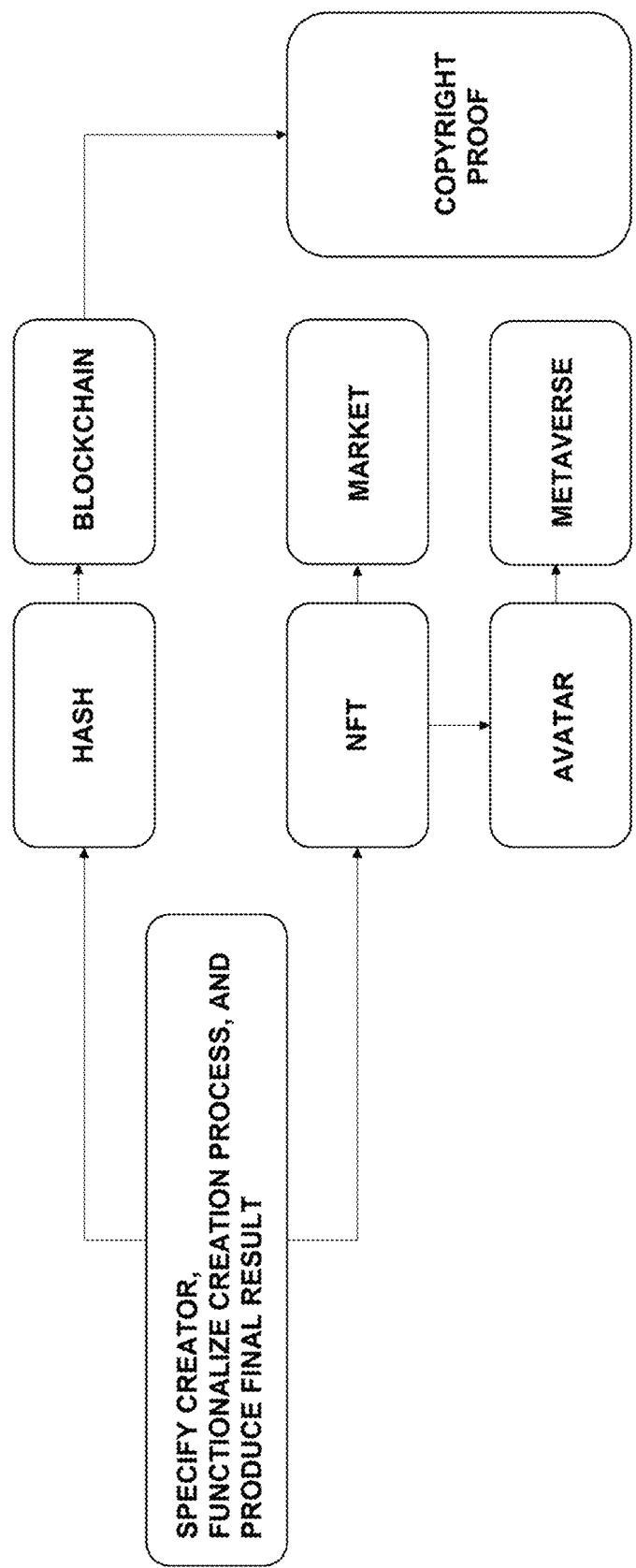
FIG. 15 is a diagram illustrating a process of proving the originality of a creative design using a hash and NFT generated on the basis of creation stage-specific creative designs according to various embodiments of the present invention.

FIG. 15 is a diagram illustrating a process of proving the originality of a creative design using a hash and NFT generated on the basis of creation stage-specific creative designs according to various embodiments of the present invention.

Referring to FIG. 15, a creator generates "sequentially invertible functions" by inserting an encryption code generated by the creator to multiple image files generated in a creation process, converts the sequentially invertible functions into one final hash function, and uploads the final hash function to a blockchain. Through this process, it is possible to register and protect the design copyright of a creative work and simultaneously issue a final result of the creation process as an NFT. In other words, the invertible functions are generated from the creation process, an invertible function is generated from the final creative result, a block for the final hash code is generated on the basis of the invertible function, and the NFT is generated on the basis of the block.

The invertible functions are generated by inserting the encryption code generated by the creator to each piece of metadata (a device identifier (ID), location information, imaging time information (timestamp), quality information, such as an image resolution and the like, and the like) of multiple digital images of creation-process designs, and in the same manner, the invertible function is generated from the digital image of the final image. The final hash is generated from the invertible function and uploaded to the blockchain.

The present invention may be applied to the design of clothing sold on online commerce markets on the basis of NFTs or the designs of clothes applied to avatars on a metaverse platform. For example, the ownership of an original NFT may be vested in the creator of an original design, and an NFT derived from the original NFT may be generated and transferred with apparel or an apparel item to a purchaser of the apparel sold on the basis of the design on an online commerce market or the apparel item applied to an avatar on the metaverse platform. For example, the derivative NFT may include information related to the original NFT, the electronic signature of the original creator, and the like. Accordingly, purchasers of apparel on the online commerce market or apparel items applied to avatars on the metaverse platform can obtain proof that the apparel or apparel items are based on the original design.

Various embodiments of the present invention relate to a method and device for proving the originality of a creative design by proving the creation time of the design in relation to fine art, commercial or non-commercial art, or the like, such as apparel, shoes, an accessory, a hat, a bag, a watch, a painting, a sculpture, or the like of which visual design elements have a decisive influence on determining the market value of the goods.

Existing design-related methods employing a blockchain are based on registration and authorization of finished designs or finished shapes. However, with these methods, it is not possible to objectively (technically) prove the direct causal relationship between a creator and the original design, prevent fraud, or copying or imitating a finished design or a design sketch or shape during the creation process without the creator's consent, or to objectively prove fraud.

With the recent emergence of NFTs which prove the uniqueness of all digitizable content, such as artworks, digital music, commercial and non-commercial designs, and the like, along with new technologies, such as blockchain, metaverse, cryptocurrency, and the like, there have been high expectations that it will be possible to overcome the technical limitations of existing copyright registration and protection. However, there have been side effects such as issuing NFTs of other people's works without the approval and consent of the copyright holder or issuing NFTs of imitations or counterfeits. These problems represent that it is not possible to overcome the logical limitations of the current copyright registration and protection system, which requires copyright registration and rights based on a "finished image or shape," and NFTs issued on the basis of the copyright registration and protection system also have fundamental limitations in proving unequivocal uniqueness on the basis of the direct causal relationship between the creator and the creative work.

The textile fashion industry is a very fast-moving market in which new designs and products are created, produced, and distributed seasonally. The legal procedures and time required for registration and authorization under the current design copyright system are not only inappropriate for the fast fashion-driven textile and fashion industries but also lead to frequent economic and psychological damage to creators and significant social costs due to market-destroying activities such as design theft, plagiarism, and the like that occur inertially. In addition, the current copyright registration and authorization system is recognized as a hindrance to the overall qualitative growth of the industrial ecosystem and thus is proven to be an unreasonable alternative.

According to the recently emerged NFT technology, it is also impossible to prevent copyright infringement and fraud such as third parties issuing NFTs for financial gain without the authorization of the creator. To solve these problems, according to the present invention, it is possible to functionalize the "intermediate result images in the creation process and a final creative result image," convert the functions into a single hash to digitize the causality between the creation process and the creative result, and upload the single hash to a blockchain to clearly prove the causality, thus protecting the copyright of creative works.

Various embodiments of the present invention propose a method of proving the originality of a creative design by proving that a creator is the creator of the design and the time point of creation. The creator may sequentially photograph intermediate designs using a terminal device with a camera during the creation process, generate a plurality of pieces of hash information on the basis of metainformation about image files of the plurality of pieces of intermediate designs and a final design, which may show the development of the design creation process, and issue the plurality of pieces of hash information as an NFT while uploading the hash information to a blockchain.

Various embodiments of the present invention are intended to prove the direct causal relationship between a creator and a creative design and also prove whether the original design was applied to each distributed product by issuing a new NFT associated with the NFT of the original design for each of distributed products, to which the creative design was applied, and transferring ownership of the newly issued NFT to a purchaser of the product.

When embodiments of the present invention are implemented using hardware, application-specific integrated circuits (ASICs), digital signal processors (DSPs), digital signal processing devices (DSPDs), programmable logic devices (PLDs), field programmable gate arrays (FPGAs), or the like configured to perform the present invention may be included in the processor of the present invention.

Meanwhile, the method described above can be implemented as a program executable in a computer and executed in a general-use digital computer that executes the program using a computer-readable medium. The structure of data used in the foregoing method may be recorded in computer-readable storage medium in various ways. It should be understood that program storage devices that may be used for describing a storage device including executable computer code for performing various methods of the present invention do not include temporary objects such as carrier waves or signals. The computer-readable storage medium includes a storage medium such as a magnetic storage medium (e.g., a read-only memory (ROM), a floppy disk, a hard disk, or the like) or an optical medium (e.g., a compact disc (CD)-ROM, a digital versatile disc (DVD), or the like).

The embodiments described above are constructed by combining components and features of the present invention in a certain form. Each component or feature should be considered selective unless explicitly mentioned otherwise. Each component or feature may be implemented without being combined with other components or features. In addition, some components and/or features may be combined into an embodiment of the present invention. The sequence of operations described in embodiments of the present invention may be changed. Some elements or features of an embodiment may be included in another embodiment or replaced by corresponding elements or features of another embodiment. It is obvious that claims not explicitly recited may be combined into an embodiment or included as a new claim by amendment after filing.

Those skilled in the art will appreciate that the present invention may be implemented in other specific forms without departing from the technical spirit or essential features thereof. Therefore, the above embodiments are to be construed as illustrative rather than restrictive in all aspects. The scope of the present invention should be determined by a reasonable interpretation of the appended claims and all possible variations within the scope of the present invention or an equivalent thereof.

The present invention relates to a method and device for proving the originality of a creative design work and who is the original creator in a communication system by proving the causal relationship between the creation process of the creative design work and the resultant creative work using the hash codes of images in creation stages of the creative design work.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An operating method of a first terminal including a transceiver, a memory, a processor, an input device, an output device, and a camera in a communication system, the operating method comprising:
    capturing, by the camera, a plurality of intermediate images in creation stages of a design and one final image, wherein the plurality of intermediate images are captured during creation times of the creation stages of the design and the final image is captured during a final creation time of the design;
    extracting, by the processor, a plurality of pieces of binary metadata from the plurality of intermediate images and the final image;
    inputting, by the processor, the plurality of pieces of binary metadata to a first function stored in the memory to generate a plurality of pieces of intermediate image hash information and final image hash information;
    generating, by the processor, final hash information based on the plurality of pieces of intermediate image hash information and the final image hash information using a second function stored in the memory, wherein the second function is configured to generate the final hash information differently depending on an order of computation of the plurality of pieces of intermediate image hash information and the final image hash information;
    generating, by the processor, first block information about a first non-fungible token (NFT) based on information related to the first terminal, information on the final image, and the final hash information;
    transmitting, by the transceiver, the first block information to a blockchain network;
    receiving, by the transceiver, a proof request message for the plurality of intermediate images generated in a creation process of the final image corresponding to the first NFT from a second terminal which is one of a plurality of nodes constituting the blockchain network; and
    transmitting, by the transceiver, a proof response message including information on the plurality of intermediate images, information on the first function, information on the second function, and information on the order of computation to the second terminal.

2. The operating method of claim 1, wherein the plurality of pieces of binary metadata correspond to binary data of metadata of the plurality of intermediate images and the final image, and
    the metadata includes camera information and imaging time information of the plurality of intermediate images and the final image.

3. The operating method of claim 1, wherein the order of computation is based on an order in which the plurality of intermediate images and the final image are created.

4. The operating method of claim 1, further comprising:
    immediately after the plurality of intermediate images are captured, generating, by the processor, a plurality of pieces of second block information about a plurality of second NFTs encrypted on the basis of the plurality of intermediate images using a first encryption key; and
    immediately after the plurality of pieces of second block information are generated, transmitting, by the transceiver, each of the plurality of pieces of second block information to the blockchain network,
    wherein the proof response message further includes information related to the plurality of second NFTs, information on a second encryption key for decrypting the plurality of NFTs, and information on the creation time of each of the plurality of intermediate images based on the time at which each of the plurality of pieces of second block information is transmitted to the blockchain network.

5. The operating method of claim 1, further comprising: immediately after the plurality of intermediate images are captured, generating, by the processor, the plurality of pieces of intermediate image hash information about the plurality of intermediate images and a plurality of pieces of second block information on the basis of the plurality of pieces of intermediate image hash information using the first function; and immediately after the plurality of pieces of second block information are generated, transmitting, by the transceiver, each of the plurality of pieces of second block information to the blockchain network, wherein the proof response message further includes information related to the plurality of pieces of second block information and information on the creation time of each of the plurality of intermediate images based on the time at which each of the plurality of pieces of second block information is transmitted to the blockchain network.

6. The operating method of claim 1, wherein the memory is configured to store a plurality of image hash functions, and the second function is one of the plurality of hash functions randomly selected by the processor.

7. A first terminal in a communication system, comprising:
a transceiver;
a memory;
a processor;
an input device;
an output device; and
a camera,
wherein the processor is configured to:
obtain, by the camera, a plurality of intermediate images in creation stages of a design and one final image, wherein the plurality of intermediate images are captured during creation times of the creation stages of the design and the final image is captured during a final creation time of the design;

extract, by the processor, a plurality of pieces of binary metadata from the plurality of intermediate images and the final image;

apply, by the processor, the plurality of pieces of binary metadata to a first function stored in the memory to generate a plurality of pieces of intermediate image hash information and final image hash information;

generate, by the processor, final hash information based on the plurality of pieces of intermediate image hash information and the final image hash information using a second function stored in the memory, wherein the second function is configured to generate the final hash information differently depending on an order of computation of the plurality of pieces of intermediate image hash information and the final image hash information;

generate, by the processor, first block information about a first non-fungible token (NFT) based on information related to the first terminal, information on the final image, and the final hash information;

transmit, by the transceiver, the first block information to a blockchain network;

receive, by the transceiver, a proof request message for the plurality of intermediate images generated in a creation process of the final image corresponding to the first NFT from a second terminal which is one of a plurality of nodes constituting the blockchain network; and transmit, by the transceiver, a proof response message including information on the plurality of intermediate images, information on the first function, information on the second function, and information on the order of computation to the second terminal.

* * * * *